United States Patent
Schofalvi et al.

(10) Patent No.: US 7,488,544 B2
(45) Date of Patent: *Feb. 10, 2009

(54) THERMAL SHOCK RESISTANT CERAMIC COMPOSITES

(75) Inventors: Karl-Heinz Schofalvi, Solon, OH (US); Gerald C. Dodds, Chardon, OH (US)

(73) Assignee: Stanton Advanced Ceramics, LLC, Cleveland, OH (US)

( * ) Notice: Subject to any disclaimer, the term of this patent is extended or adjusted under 35 U.S.C. 154(b) by 200 days.

This patent is subject to a terminal disclaimer.

(21) Appl. No.: 11/417,608

(22) Filed: May 4, 2006

(65) Prior Publication Data

US 2007/0104935 A1    May 10, 2007

Related U.S. Application Data

(63) Continuation of application No. 10/495,702, filed as application No. PCT/US02/37158 on Nov. 19, 2002, now Pat. No. 7,081,294.

(60) Provisional application No. 60/332,732, filed on Nov. 19, 2001.

(51) Int. Cl.
    *B32B 9/00*    (2006.01)
(52) U.S. Cl. .................. 428/701; 428/702; 428/293.4
(58) Field of Classification Search .............. 156/89.11, 156/145, 245, 281, 286, 307.5, 325; 204/471, 204/479, 483, 489, 490, 491, 507, 509, 510; 264/136, 621, 137, 641, 642; 423/263, 600; 427/252, 370, 376.2, 379, 380, 397.7, 397.8, 427/404, 419.2; 428/292.1, 315.9, 325, 381, 428/695, 315.5, 315.7, 317.1, 375, 376, 378, 428/379, 380, 384, 388, 389, 390, 391, 392, 428/398, 418, 458, 462, 473.5, 701; 501/127, 501/95.1, 12, 128, 152, 153, 86, 88, 90, 95.2; 502/333, 241, 262, 324, 339; 523/200, 205, 523/207, 216, 217

See application file for complete search history.

(56) References Cited

U.S. PATENT DOCUMENTS

| 4,839,402 | A | * | 6/1989 | Stevens | 523/200 |
| 4,935,296 | A | * | 6/1990 | Stevens | 428/381 |
| 5,006,423 | A | * | 4/1991 | Draskovich | 428/698 |
| 5,126,087 | A | * | 6/1992 | Lespade et al. | 264/136 |
| 5,340,655 | A | * | 8/1994 | Creber et al. | 428/446 |
| 5,378,665 | A | * | 1/1995 | Chen et al. | 501/95.1 |
| 5,422,331 | A | * | 6/1995 | Galligan et al. | 502/333 |
| 5,609,741 | A | * | 3/1997 | Illston et al. | 204/471 |
| 6,497,776 | B1 | * | 12/2002 | Butler et al. | 156/89.11 |
| 7,081,294 | B2 | * | 7/2006 | Schofalvi et al. | 428/325 |
| 2003/0022783 | A1 | * | 1/2003 | DiChiara, Jr. | 501/127 |

FOREIGN PATENT DOCUMENTS

JP    07-018249 A  *  1/1995

OTHER PUBLICATIONS

Claussen, N. and G. Petzow. Whisker-reinforced zirconia-toughened ceramics. Ceramics. Tressler, Messing, Pantano & Newnham, Eds. Tailoring of Multiphase and Composite. (pp. 649-662). Plenum Publishing Corp., 1986.*

Mazdiyasni, K.S. Fiber Reinforced Ceramic Composites. (pp. 1-39, 93-109, 122-140, 182-192, 328-341, & 434). William Andrew Publishing/Noyes, 1990. Online version available at: http://www.knovel.com/knovel2/Toc.jsp?BookID=364&VerticalID=0.*

International Search Report, Application No. PCT/US02/37158, mailed Feb. 13, 2003.

U.S. Appl. No. 10/495,702, filed May 14, 2004.

* cited by examiner

*Primary Examiner*—Timothy M Speer
(74) *Attorney, Agent, or Firm*—Renner, Otto, Boisselle & Sklar, LLP

(57) ABSTRACT

The disclosed invention relates to a ceramic composite, comprising: reinforcement fibers, the reinforcement fibers comprising alumina, zirconia or magnesium silicate; the reinforcement fibers containing microcracking; and deposits derived from a sol comprising alumina or zirconia and optionally a rare earth oxide reacted with the reinforcement fibers. A process for making the composite is also disclosed.

18 Claims, No Drawings

THERMAL SHOCK RESISTANT CERAMIC COMPOSITES

This application is a continuation of U.S. patent application Ser. No. 10/495,702 filed on May 14, 2004 now U.S. Pat. No. 7,081,294, which is a 371 of PCT/US02/37158 filed Nov. 19, 2002, which claims the benefit of U.S. Provisional Application Ser. No. 60/332,732, filed Nov. 19, 2001. These prior application are hereby incorporated herein by reference in their entirety.

The present invention is directed to ceramic matrix composites with a ceramic fiber reinforcement. More specifically, the present invention is directed to ceramic matrix composites reinforced with an alumina reinforcement. More particularly, the present invention is directed to ceramic matrix composites with an alumina reinforcement wherein the reinforcement is in the form of a reactive alumina in the prepreg.

BACKGROUND OF THE ART

The high temperatures experienced by materials in applications such as the iron and steel industry typically requires the used of ceramic composites. Temperatures in excess of about 2200° F. limit the use of most ceramics to a single use due to the high thermal shock experienced by the material and the limitations of the composite structure. Typical applications of ceramic composites in the iron and steel industry include slide gates, tundish lances, and various castable shapes such as cones and mill rolls. Other applications include fuel cells and electric kiln tiles. In another high temperature application, the materials from which rocket nozzles currently are manufactured include polymer matrix composites and carbon-carbon composites. The ablative and erosive characteristics of polymer matrix composites limit nozzle performance, and carbon-carbon composites entail high manufacturing costs and possible environmental dangers. To meet the multiple requirements of high performance such as resistance to erosion, ablation and thermal shock, and low manufacturing cost, a unique approach to nozzle fabrication must be taken.

Methods exist to fabricate ceramic composites for less demanding, lower temperature applications. One process results in an extensively microcracked multi-phase ceramic capable of withstanding severe thermal conditions. Briefly, a woven preform or a felt mat of ceramic fibers may be impregnated by immersion in a pre-ceramic sol and fired. During firing the fibers of the preform react with the colloidal ceramic particles in the sol to produce a ceramic material having compositional gradients essentially normal to the original fiber directions. The extent of reaction between fiber and matrix, which is controlled by temperature and materials selection, may be limited to leave a residual fiber architecture in place. A high degree of microcracking in the fired ceramic can be ensured by the appropriate combination and size of the starting materials. Porosity in the product can be reduced to a desired level by one or more cycles of vacuum re-impregnation and firing. The extensive microcracking imparts some degree of thermal shock resistance to the ceramic. While a residual fiber architecture leaves the ceramic with a crack deflection network, the distribution of micro cracks may provides some additional stress relief mechanisms to prevent macroscopic failures resulting from large and sudden temperature changes.

Some methods of fabrication of ceramic composite may utilize reinforcement such as magnesium silicate glass, wherein upon firing of the composite the reinforcement interact with the sol matrix in such a manner as to be indistinguishable from the matrix, thus limiting the thermal shock resistance of the material. The fibrous matrix may be retained but the temperature limitations of the matrix and fiber still limit the use of the ceramic to applications below about 2200 F. Furthermore, the resulting composite may be deficient in thermal shock resistance and impact resistance for more demanding, high temperature applications.

It is desirable, and therefore an object of the invention, to provide a higher temperature ceramic composite that will resist thermal shock, impact, chemical attack and withstand temperatures of greater than 2200 F.

SUMMARY OF THE INVENTION

This and other objects of the invention are provided by a ceramic composite able to withstand temperatures in excess of 2200 F on a repeated basis without cracking due to thermal shock, particularly one that comprises a web of reinforcement fibers and a matrix, formed from an alumina sol that impregnates the web prior to a firing step said matrix substantially embedding the web after the firing step.

In some embodiments of the invention, the matrix further comprises at least one rare earth oxide, through inclusion of at least one rare earth oxide in the impregnating sol. The rare earth oxides may be present in the range of from 0 to about 60% by weight, relative to the alumina in the sol.

In a preferred embodiment, the web is a three-dimensional orthogonal weave of the reinforcement fibers, particularly where the fibers comprise a transitional phase alumina prior to the firing step, and more particularly where the transitional phase alumina is γ-alumina.

In some embodiments of the invention, the web comprises from about 10 to about 40% by weight of the composite, after the firing step.

In most embodiments of the invention, the composite is essentially free of Group I and Group II metals and transition metal oxides.

In most embodiments of the invention, the reinforcement fibers are partially digested by the sol used to manufacture the matrix during the impregnation step, and this partial digestion, combined with the firing steps, results in microcracking of the web fibers.

The composite material of the invention finds uses as refractory brick and insulation due to its thermal shock resistance and chemically non-reactive nature.

DETAILED DESCRIPTION OF A PREFERRED EMBODIMENT

In order to obtain a ceramic with high temperature thermal shock resistance, that is, thermal shock resistance at temperatures above 2200 F, and with acceptable cost, an alumina reinforced alumina matrix composite may be envisioned. However, typical alumina fibrous reinforcements are fabricated from α-alumina. Fabrication of an alumina matrix composite using α-alumina results in a material with poor thermal shock resistance to the poor adhesion of the matrix with the reinforcement. The α-alumina does not react to any significant degree with the matrix during gelling and firing, as it is essentially an "end stage" material.

By contrast, it has now been found that ceramic composites having a high thermal shock resistance may be fabricated using an alumina sol and a reactive alumina reinforcement. The materials may be used in applications experiencing temperatures up to 3100 F. One such reinforcement is a transitional phase alumina known as γ-alumina, which is an underoxidized precursor to α-alumina. The γ-alumina has a reactive surface and reacts with the alumina sol to form an intimate composite with superior interfacial adhesion between the matrix and reinforcement. The resulting composite has desirable thermal shock properties and a high use temperature. Typically, articles produced from the composite may be used several times in molten iron and steel applications, rather than the single use typical with prior art materials.

Several benefits may be realized using the methods and materials of the present invention, including:

1) Low manufacturing cost. Material synthesis and component fabrication can be accomplished using raw materials that are commercially available. Thermal processing of the composites can be carried out in air. It is not necessary to use vacuum furnaces, autoclaves or special process gases.
2) Improved erosion resistance. The proposed materials are non-ablative and may be surface hardened, eliminating the need for hardened inserts.
3) Excellent resistance to thermal shock. The present materials may resist thermal shock in application experiencing temperature far in excess of 2200 F, which is believed to be the upper temperature limit for the known ceramic materials.

Representative materials used in the fabrication of ceramic composites are shown in Table 1. For lower temperature applications as described in the prior art, the ceramic comprises an alumina matrix reinforced with a magnesium silicate glass. The ceramic so obtained is limited in temperature applications to approximately 2200 F.

The material systems listed in Table 1 are pre-selected based on their projected temperature capabilities and the availability of fibers and sol constituents. Actual use of the various materials is based on processing and cost considerations as well as temperature limitations. Highest temperature capability is obtainable using zirconia fiber. Zirconia fiber is expensive, however and may be cost effective only with a randomly oriented felt starting material.

Processing considerations include the relative ease with which a sol system can be worked. Sol stability, the ability to control gelation of the sol, reactivity of the sol with the fibers in the preform, and product yield comprise the principal processing considerations. Raw materials, especially fiber preforms, comprise a major cost element in manufacturing from the ceramic systems listed in Table 1.

TABLE 1

Material Systems.

| System Number | Initial Reinforcement | Basic Sol & Filler or Secondary Sol (Impregnant) | Resulting Material System | Projected Steady-State Temperature Capability (° F./° C.) |
|---|---|---|---|---|
| 1 | Magnesium Silicate glass | Alumina sol + Alumina powder | Cordierite, mullite and corundum multi-phase ceramic | 2200/1254 |
| 2 | Alumina* | Alumina sol + Yttria powder | Alumina-Yttira solid solution with concentration gradients | 3100/1704 |
| 3 | Alumina* | Zirconia sol + YAG and Hafnium Nitride powder | Multi-phase ceramic | 3300/1816 |

TABLE 1-continued

Material Systems.

| System Number | Initial Reinforcement | Basic Sol & Filler or Secondary Sol (Impregnant) | Resulting Material System | Projected Steady-State Temperature Capability (° F./° C.) |
|---|---|---|---|---|
| 4 | Zirconia* | Zirconia sol + YAG and Hafnium Nitride powder | Multi-phase ceramic | 3700/2038 |

*Woven perform or felt mat

Magnesium silicate glass fiber is the least expensive reinforcement, zirconia fiber is the most expensive. If cost were the sole criterion, material system number 1 (Table 1), which is known in the prior art, would be selected.

For reasons of cost, felt mats of a given fiber type are used in addition to woven preforms. Matted preforms are much less expensive to produce than woven preforms. Woven preforms provide good rigidity and control of phase orientation and directional properties; but multi-directional weaving of continuous fibers into rigid preforms is expensive. This matrix provides a direct cost and performance comparison of random orientation non-woven versus direction ally oriented woven fiber reinforcement for structures.

Temperature capability limits the usefulness of a material for a given application. If temperature capability was the sole selection criterion, material system number 4 would be chosen from Table 1. This material is also the most expensive; however, production volume and/or using the random oriented felt hold down cost. The other properties important to applications, erosion resistance and thermal shock resistance, have been discussed. Erosion resistance is enhanced by surface hardening with a plasma sprayed layer of hafnium carbide or other compatible refractory ceramic carbide.

Some aspects of the manufacturing process have been established with other ceramic materials. A preform of silica-magnesia glass is wetted with an alumina precursor. The precursor consists of a polymerized alumina sol. At heating to at least 1380° C., the silica and magnesium in the glass react with the alumina to form the crystalline phases cordierite and mullite. Substantially no glass fiber remains. This differs from the present method of leaving a substantial fiber architecture behind for mechanical strength and increased thermal shock. The final structure exhibits compositional gradients, with silicon concentrations being higher in regions nearest the original locations of the glass fibers, and decreasing as the distance from the location of glass fiber increases. The alumina concentrations are lower where the silica concentrations are higher, and higher where the silica concentrations are lower. The concentration gradients and the intimate mixture of crystalline phases having different coefficients of thermal expansion result in an extensively micro-cracked structure. Thermal shock resistant ceramics containing the same crystalline phases also have been made starting with alumina fibers and silica precursors such as a silica sol, or a silicic acid solution, or a mixture of both.

In the present method, a transitional phase alumina, particularly a γ-alumina, reinforcement is wetted with an alumina precursor. Alternatively, the alumina precursor may include rare earth powders such as yttria, neodymium, praseodymium, erbium and lanthanum oxides, including mixtures of the rare earth powders, even in an "as mined" condition. One or more rare earths may be included in the alumina precusor. The sol should be essentially free of silicates, calcia and other compounds used to effect adhesion in known ceramic materials.

To prepare the alumina precursor sol, alumina power is mixed with water to obtain a concentration suitable for use as an impregnant sol. Rare earth powder may be included with the alumina. The concentration of alumina and rare earths, if any, in the water may be in a range of about 10 weight percent up to about 40 weight percent. Alternatively, the concentration of alumina and rare earths, if any, may be about 20 weight percent. The alumina and rare earths, if any, in water mixture is mixed with a mineral acid to a obtain a low pH in the mixture. In one embodiment, the alumina/water mixture may be titrated with HNO3 or HCl to a pH of about 3 to about 4. The mixture may be stirred for about 24 hours to allow stabilization of the sol. The supernatent resulting from the mixture may be stored indefinitely prior to use as a composite impregnant. A detailed experimental procedure is now given Composite Preparation An oxide sol is formulated first, as follows. An alumina is selected with a zero point of charge (ZPC) of 9.1, and a $Y_2O_3$ with an 8.95 ZPC is also selected. A source of such alumina is CATAPAL brand dispersible alumina. Of 200 gm of alumina weighed out, 100 gm are added to 1800 gm deionized water, stirring vigorously on a magnetic stiring plate while the oxides are added. Slowly add $HNO_3$ (65-70% assay) to the oxide/water mixture while mixing. Measure the pH of the mixture and titrate with the nitric acid until the pH is in the 3-4 range. The remaining 100 gm of alumina are then added, and nitric acid is again added to titrate the mixture to the 3-4 pH range. Cover the system tightly to minimize evaporation and mix for 24 hrs. At the end of 24 hrs, turn off the agitator, remove the mixing bar, and allow the sol to age undisturbed for 24 hrs. During this period, the coarsest agglomerate particles will settle out.

Siphon off the supernatant liquid, taking care to not disturb settled particles. Dry and weigh settled particulate. This sol should now be able to be stored indefinitely without further settling of particles. Sol concentration may be calculated.

A rare earth mixed oxide sol is prepared in a similar manner, but in this case 1200 gm deionized water is used. Two equal batches of $Pr_6O_{11}$ powder are weighed out, each weighing 37.83 gms. Two equal batches of $Y_2O_3$ powder are also weighed out, each weighing 2 gms. One batch each of the two powders are added to the water while under magnetic stirrer agitation. About 10 mls $HNO_3$ is added and mixed for eight hours, after which the mixture is titrated to the 3-4 pH range. The remaining batches of powder are added and further titration with the nitric acid is done, as necessary.

Typical sols prepared for impregnating woven preforms of alumina would include a 100% alumina sol, a blended sol of 60% alumina and 40% yttria, and a blend of 40% alumina, 40% yttria and 20% praeseodymia. All above percentages are by weight.

A sol manufactured in this manner is used to impregnate a preform, especially a preform comprising a transitional phase alumina, and most especially a preform comprising a three-dimensional orthogonal weave of transitional phase alumina fibers. Any fiber sizing may be burned out of the preform by heating in air at 400 C for about 4 hrs. The sol and preform are each weighed and measured and the preform is immersed into the sol in a beaker for initial infiltration. The beaker is evacuated in a bell jar or other suitable vacuum device to a pressure of about 28 in. Hg, until bubbling subsides, which will take about 5 to 10 minutes. Since the onset of this vacuum infiltration may be accompanied by violent bubbling and frothing, the operation should be closely attended to control the vacuum to prevent spillage of sol due to bubbling. When the bubbling subsides, the bell jar is vented and the preform may be removed from the sol and allowed to drip dry for a few minutes over the sol, to capture excess sol. The preform is then dried at 50 C for 2 hrs.

The pH of the sol should be measured and adjusted with nitric acid, if necessary, to the range of 3-4. After measuring the weight of the dried preform, the impregnation step of the above paragraph may be repeated as many times as necessary until a desired weight of sol is impregnated into the preform.

Once the preform has been suitably impregnated, the preform is fired at 400 C to mechanically lock the infiltrant sol into the preform macrostructure. The steps from impregnation through this firing step may be repeated as necessary to obtain the desired level of sol matrix around the preform. Typically, seven to nine cycles will be used.

After the mechanical lock-in of the impregnant is completed, the composite material may be fired to 1800 C for two hours to chemically lock the sol matrix into place.

The alumina sol may include rare earth oxide materials. For example, the sol may contain about 20 weight percent alumina and rare earth oxides, using a blend of about 60 percent by weight alumina and 40 percent by weight yttria oxide, or a blend of 40 percent by weight alumina, 40 percent by weight yttria oxide and 20 percent by weight praeseodymia oxide. Other combinations of alumina and rare earths may be used as determined by one of ordinary skill without undue experimentation.

The alumina and rare earth sol is used to impregnate a γ-alumina fibrous reinforcement. The γ-alumina fibrous reinforcement may be made from any suitable fiber. One source of the γ-alumina fiber is an experimental fiber XN-508 from 3M Company, St. Paul, Minn. This fiber is a 1500 denier 170 sized 12.3 μm pre-crystallized NEXTEL™ 610 roving. Infiltration and firing of the composite are as indicated in Table 2. The preferred reinforcement is a three-dimensional orthongonal weave.

Zirconia precursors have been made of several types of sols including hydrated zirconium chloride and zirconium acetate. The zirconia precursor may be prepared via zirconium hydroxide sols loaded with desired concentrations of YAG (yttrium aluminum garnet) and hafnium nitride powders. The YAG may offer sintering nucleation sites and CTE crack planes between grains. The hafnium nitride powder will have a chemical compatibility to the hafnium carbide plasma spray material for chemical bonding adhesion of the coating to the bulk.

Sol mixing, gelation and firing are conducted to ensure acceptable yields of alumina and zirconia products. A starting point for a loaded zirconia precursor is a commercial zirconium hydroxide solution with powder additions of 10 wt % zirconia, 5 wt. % YAG and 25 wt % hafnium nitride. Following gelation, the precursor is made to wet short fiber tows or small squares of fiber mat. The impregnated specimen will be fired to 3300° F. (1815° C.), and the products are analyzed for overall yield, composition and morphology. Modifications to sol formulation and thermal process variables is made as necessary to obtain thermal shock resistant characteristics.

Panels of each ceramic composite material are fabricated using the process described in detail above for each material system. Typically, twelve panels of each of the two down selected materials versions are produced. Six panels of each version will have woven reinforcement, six will have the non-woven reinforcement. These 24 samples are placed into two test matrices to investigate optimal plasma spray thickness and ideal number of re-impregnation cycles. Nominal panel dimensions are six inches by six inches by one-half inch (6"×6"×0.5"). A minimum of two impregnations and firings will be done in the course of processing each panel. Specimens from at least one panel of each material type are used for plasma spraying trials.

TABLE 2

Mechanical Testing and Characterization Plan.

| Test Type | Specimen condition | Number of replicates per material type and specimen condition |
| --- | --- | --- |
| Three-point flexure | Three-point flexure | 5 |
| | After thermal shock test | 5 |
| Work of fracture (WOF) | As made | 5 |
| | After thermal shock test | 5 |
| Density and open porosity by alcohol immersion | As made | 5 flex and 5 WOF |
| Morphology by optical and/or SEM | As made | 1 typical |
| Semi-quantitative chemical composition by EDX | As made | 1 typical |
| Crystalline phases by XRD | As made | 1 typical |

Through the use of the above method, and through the use of similar materials, a ceramic composite that exhibits thermal cracking resistance when cycled to temperatures in excess of 2200 F is provided. A number of uses of such a ceramic composite are known, and the availability of the material provided by the present invention will certainly permit the development of new uses that are not presently foreseen or foreseeable. The further advantage of chemical resistance provided by the absence of adhesive agents such as silicates and calcia in the composite will also provide previously unanticipated uses.

One use of the composite material is as a refractory brick or liner material, with known uses in the steel and cement clinker industries, just to name a few.

Because the composite material does not contain silicates and/or calcia, the chemical resistance of the composite material makes it an attractive insulating material for high temperature chemical reaction systems, including, for illustrative purposes only, fuel cells.

The invention claimed is:

1. A ceramic composite, comprising: reinforcement fibers, the reinforcement fibers comprising alumina, zirconia or magnesium silicate; the reinforcement fibers containing microcracking; and deposits derived from a sol comprising alumina or zirconia and optionally a rare earth oxide reacted with the reinforcement fibers.

2. The composite of claim 1 wherein the reinforcement fibers comprise γ-alumina.

3. The composite of claim 1 wherein the reinforcement fibers are in a random oriented non-woven structure, a directionally oriented woven structure, a random oriented felt structure, a multidirectional weaving of continuous fibers, or a three-dimensional orthogonal weave.

4. The composite of claim 1 wherein the composite is able to withstand repeated cycles of temperatures in excess of about 2200° F. (1204° C.) without cracking due to thermal shock.

5. The composite of claim 1 wherein the composite is essentially free of Group I metals, Group II metals, and transition metal oxides other than oxides of yttrium.

6. A fuel cell comprising an insulating material, the insulating material comprising the composite of claim 1.

7. A refractory brick, refractory liner, panel or insulating material comprising a ceramic composite, the ceramic composite, comprising: reinforcement fibers, the reinforcement fibers comprising alumina, zirconia or magnesium silicate; the reinforcement fibers containing microcracking; and deposits derived from a sol comprising alumina or zirconia and optionally a rare earth oxide reacted with the reinforcement fibers.

8. A ceramic composite able to withstand temperatures in excess of about 2200° F. (1204.4° C.) on a repeated basis without cracking due to thermal shock, the composite being made using a firing step, the composite comprising: a web of reinforcement fibers containing microcracking; and a matrix formed from an alumina sol, the matrix impregnating the web prior to the firing step, the matrix substantially embedding the web after the firing step.

9. The ceramic composite of claim 8 wherein:
the matrix further comprises at least one rare earth oxide through inclusion of the rare earth oxide in the impregnating sol, the amount of rare earth oxide being from 0 to 60% by weight relative to the amount of alumina in the alumina sol.

10. The ceramic composite of claim 8, wherein:
the web is a three-dimensional orthogonal weave of the reinforcement fibers.

11. The ceramic composite of claim 8, wherein:
the web comprises a transitional phase alumina prior to the firing step.

12. The ceramic composite of claim 11, wherein:
the transitional phase alumina is γ-alumina.

13. The ceramic composite of claim 8, wherein:
after the firing step, the ceramic composite constitutes from about 10 to about 40% by weight of the web of reinforcement fibers.

14. The ceramic composite of claim 8, wherein:
the reinforcement fibers are partially digested by the sol during impregnating the web.

15. The ceramic composite of claim 14, wherein:
the partial digestion and firing step result in microcracking of the web fibers.

16. A ceramic composite able to withstand temperatures in excess of about 2200° F. (1204.4° C.) on a repeated basis without cracking due to thermal shock, the composite being made using a firing step, the composite comprising: a web of reinforcement fibers containing microcracking; and a matrix formed from an alumina sol, the matrix impregnating the web prior to the firing step, the matrix substantially embedding the web after the firing step, wherein:
the composite is free of Group I and Group II metals and transition metal oxides.

17. A refractor brick, comprising:
a ceramic material able to withstand temperatures in excess of about 2200° F. (1204.4° C.) on a repeated bases without cracking due to thermal shock, the ceramic material comprising a web of reinforcement fibers containing microcracking and an alumina matrix substantially embedding the web.

18. An insulating material for a fuel cell, comprising:
a ceramic material able to withstand temperatures in excess of about 2200° F. (1204.4° C.) on a repeated basis without cracking due to thermal shock, the ceramic material comprising a web of reinforcement fibers containing microcracking and an alumina matrix substantially embedding the web, the ceramic material being free of Group I and Group II metals and transition metal oxides.

* * * * *